Nov. 30, 1943.  A. R. THOMPSON  2,335,619
PEAR PREPARATION MACHINE
Filed July 8, 1940  7 Sheets-Sheet 3
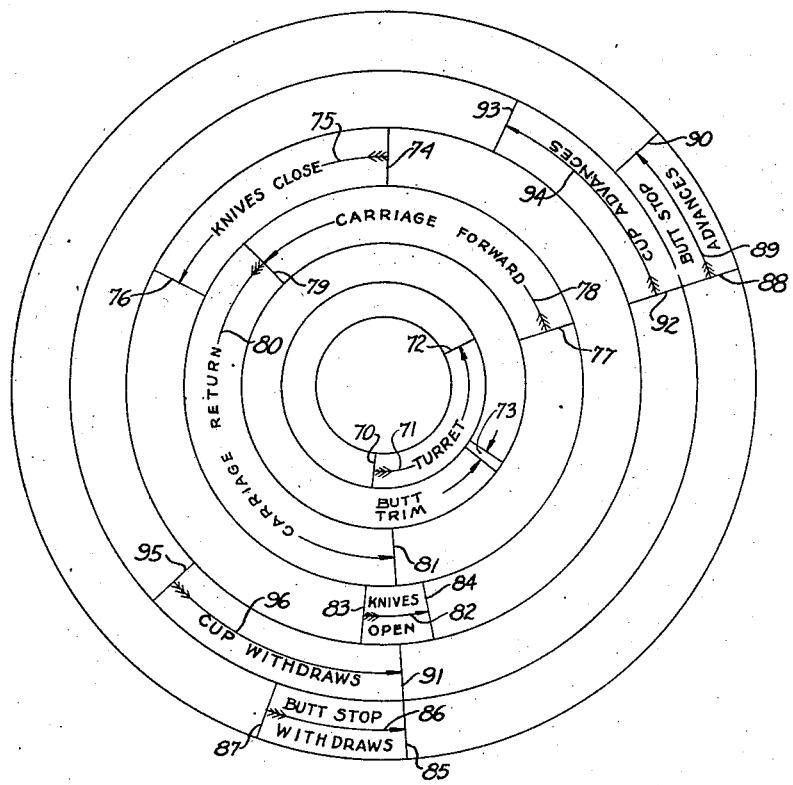
FIG_3_
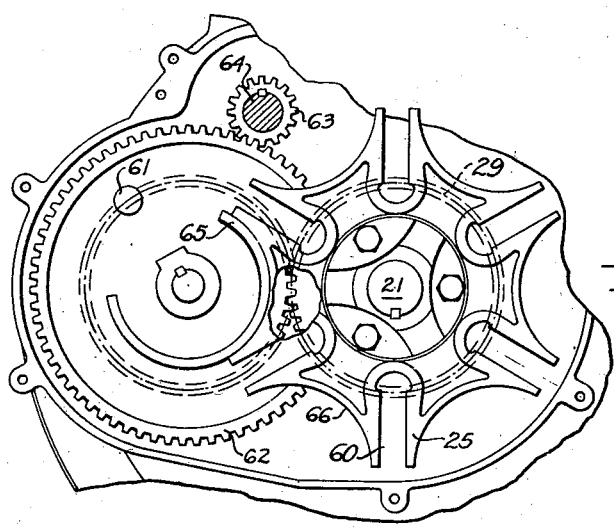
FIG_4_
INVENTOR
ALBERT R. THOMPSON
BY Philip G. Minnis
ATTORNEY Nov. 30, 1943.  A. R. THOMPSON  2,335,619
PEAR PREPARATION MACHINE
Filed July 8, 1940  7 Sheets-Sheet 4
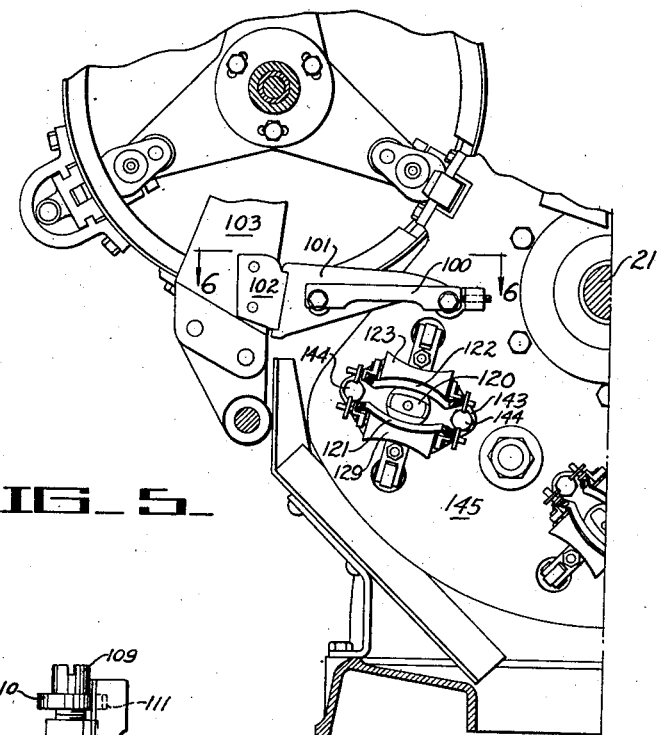
FIG_5_
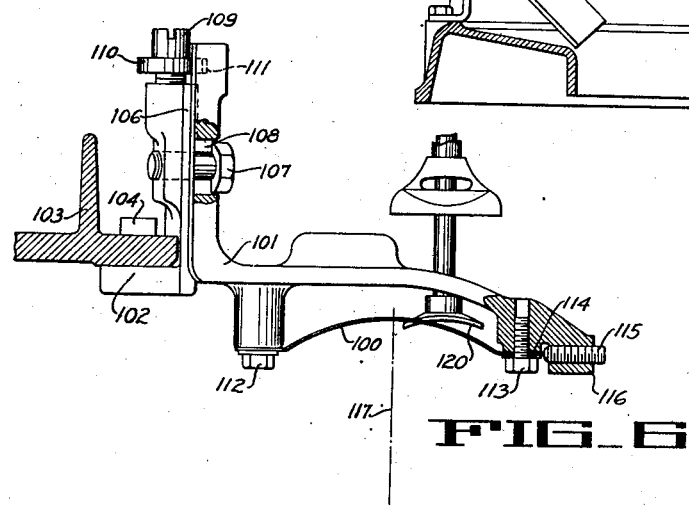
FIG_6_
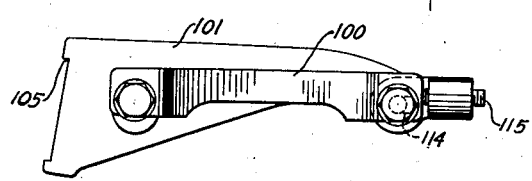
FIG_7_
INVENTOR
ALBERT R. THOMPSON
BY
ATTORNEY

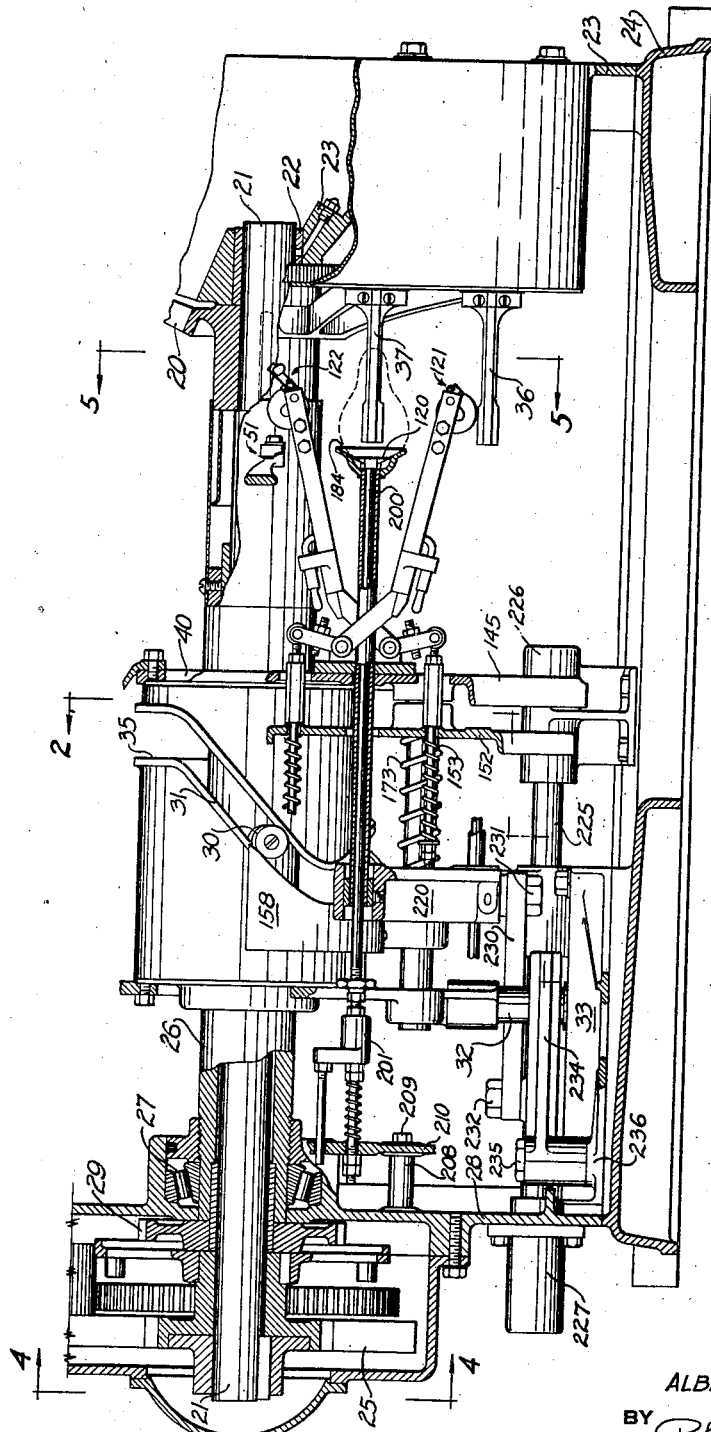

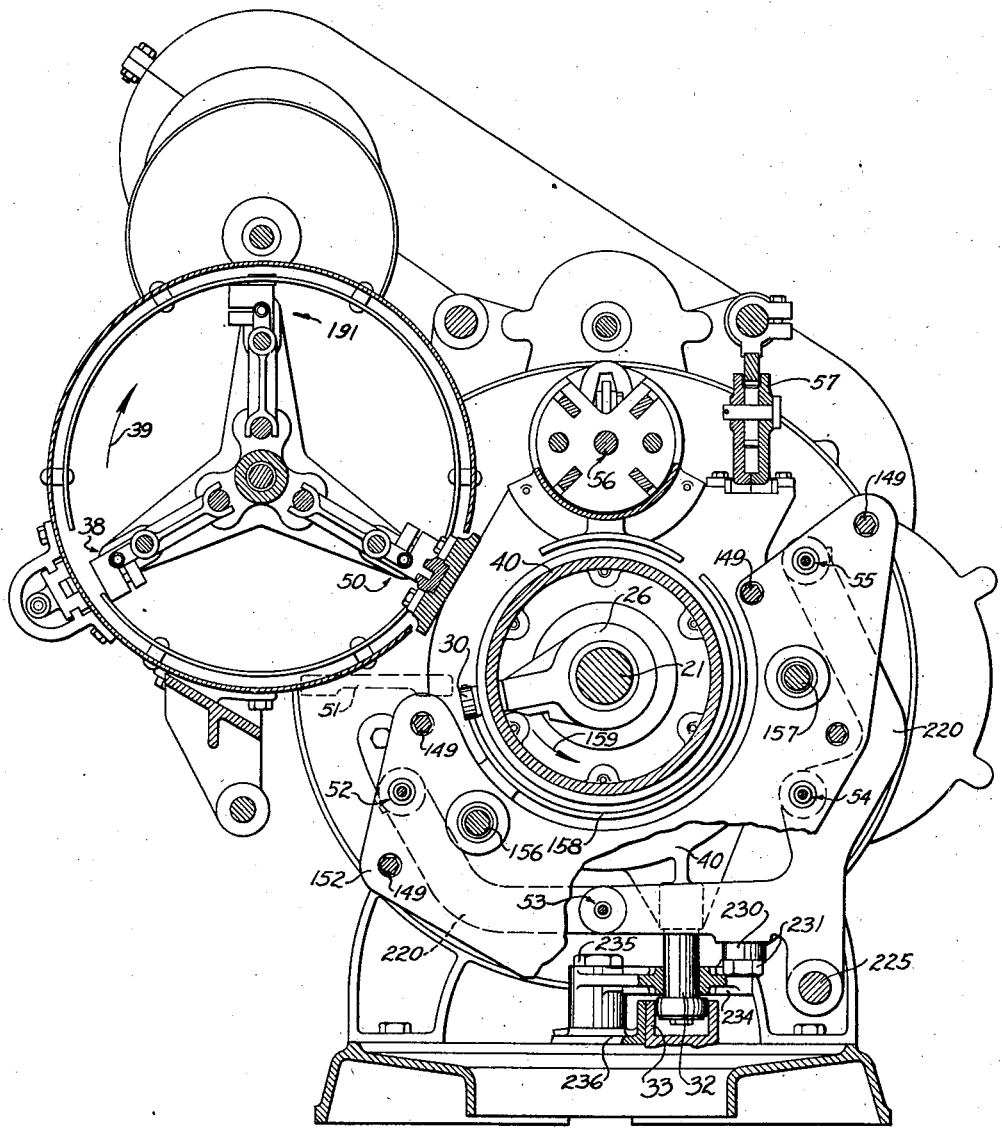
FIG_2

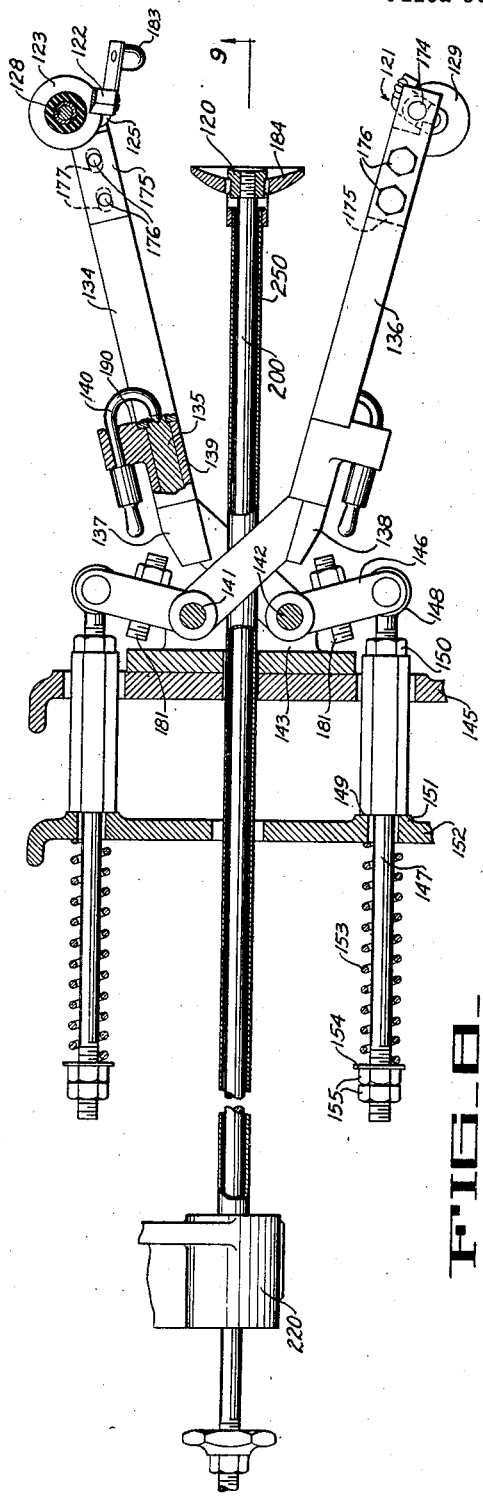

Nov. 30, 1943.   A. R. THOMPSON   2,335,619
PEAR PREPARATION MACHINE
Filed July 8, 1940   7 Sheets-Sheet 6
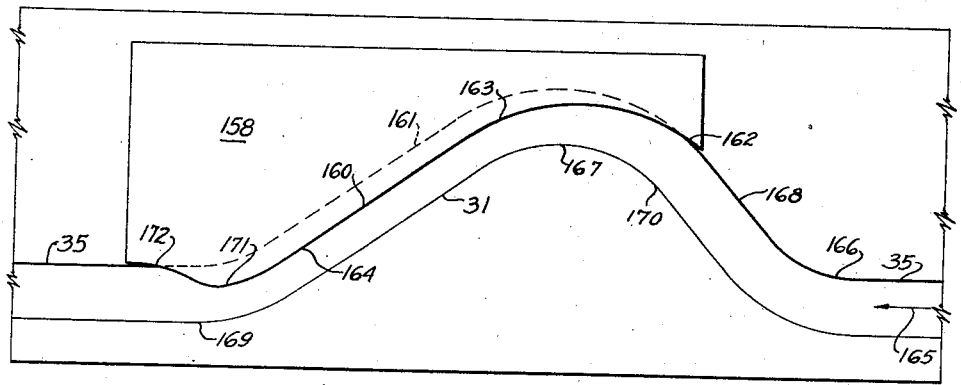
FIG_14_
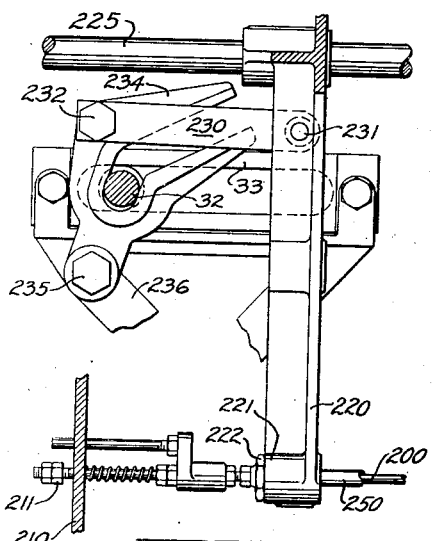
FIG_15_
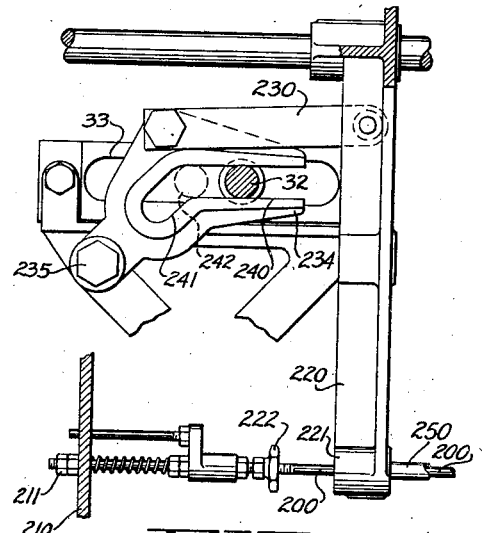
FIG_16_
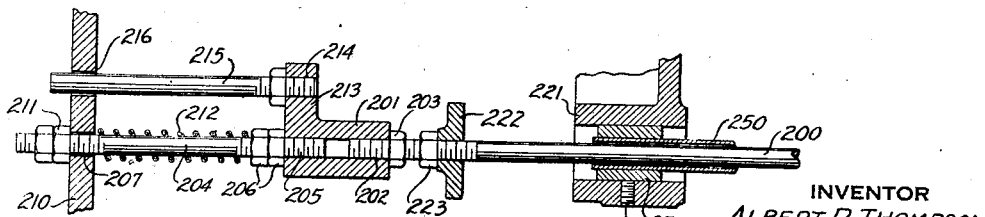
FIG_17_
INVENTOR
ALBERT R. THOMPSON
BY Philip G. Minnis
ATTORNEY Nov. 30, 1943.  A. R. THOMPSON  2,335,619
PEAR PREPARATION MACHINE
Filed July 8, 1940  7 Sheets-Sheet 7

INVENTOR
ALBERT R. THOMPSON
BY Philip A. Minnis
ATTORNEY

Patented Nov. 30, 1943

2,335,619

UNITED STATES PATENT OFFICE 2,335,619

PEAR PREPARATION MACHINE

Albert R. Thompson, Los Gatos, Calif., assignor to Food Machinery Corporation, San Jose, Calif., a corporation of Delaware Application July 8, 1940, Serial No. 344,318

21 Claims. (Cl. 146—45)

This invention relates to machines for preparing pears for canning.

In preparing pears for canning several operations are performed on the pear, which can be broadly divided into two classes: first, operations upon the exterior of the pear, and, second, operations upon the interior of the pear. The exterior operations comprise trimming off the ends of the pear and peeling off the skin. The interior operations comprise removing the stem, core, and calyx.

The invention herein disclosed relates particularly to the performance of the exterior operations.

The general object of the invention is to provide an improved mechanism for this purpose.

Another object is to provide a knife for trimming the butt of the pear which can be adjusted to vary the amount removed and also to change the contour of the finished pear at the butt.

A further object is to provide a mechanism for peeling the skin off the pear which includes a knife that automatically sets itself in the proper position for beginning the peeling operation.

A further object is to provide a stop which can be adjusted in accordance with the adjustment of the butt knife so as to contact the trimmed butt of the pear and hold the pear in position for peeling.

Another object is to provide a reciprocator for the peeling mechanism which has a variable speed operation designed to carry the peeling knives quickly to their operative positions and yet to decelerate them smoothly and bring them to a gentle stop so as to permit them to set themselves for beginning the peeling operation on the pear.

Another object is to provide a linkage operated by the reciprocator for controlling the butt stop.

In the drawings:

Fig. 1 is a longitudinal view of a pear preparation machine similar to that disclosed in U. S. Letters Patent to A. R. Thompson No. 2,139,704 dated December 13, 1938, except for the modifications embodying the present invention. Certain parts of the machine are shown in section. The mechanisms which are employed in performing the interior operations on the pear have been omitted from this view, which only shows the mechanism for performing the exterior operations.

Fig. 2 is a vertical transverse section taken as indicated by the line 2—2 in Fig. 1.

Fig. 3 is a diagram illustrating the timing of the various operations.

Fig. 4 is an end view of the power transmission mechanism with the cover of the transmission case removed, the point of view being indicated by the line 4—4 in Fig. 1.

Fig. 5 is an elevation of the butt trimming and pear peeling mechanisms, the point of view being indicated by the line 5—5 in Fig. 1.

Fig. 6 is a plan view of the same with certain parts in section and other parts removed for clarity of disclosure. The point of view is indicated by the line 6—6 in Fig. 5.

Fig. 7 is a detail view of the butt trimming knife.

Fig. 8 is an assembly view of one peeling unit, certain parts such as the butt stop device being shown in section.

Fig. 9 shows the relative positions of the parts of the butt stop device and peeling mechanism at the end of a peeling operation. The point of view is indicated by the arrow 9 in Fig. 8.

Fig. 10 is a view taken on the line 10—10 of Fig. 9 to disclose the mounting of one of the pear peeling knives.

Fig. 11 shows the position of the knife corresponding to the position of parts in Fig. 10.

Fig. 12 is a view similar to Fig. 10 with the parts in another position.

Fig. 13 shows the position of the knife corresponding to the position of the parts in Fig. 12.

Figure 18:
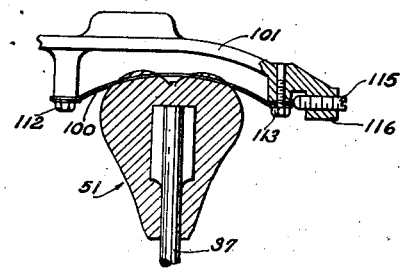
Figure 22:
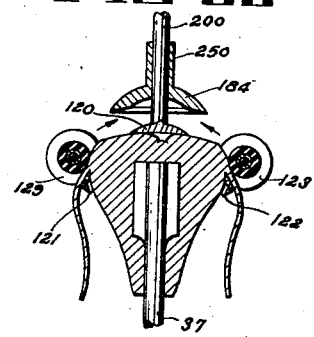

Fig. 14 discloses the developments of certain cams used in the actuating mechanism.

Figs. 15 and 16 disclose two positions of portions of the butt stop control mechanism.

Fig. 17 is a detail sectional view of part of the mechanism shown in Figs. 15 and 16.

Figs. 18 to 24, inclusive, are diagrammatic views illustrating in consecutive order the various steps of treatment of the fruit performed by the machine of the present invention.

As stated above, the present invention is illustrated and will be described as it may be embodied in a machine such as illustrated in U. S. Letters Patent to A. R. Thompson, No. 2,139,-704. Accordingly, only the modifications embodying the present invention, together with such of the parts of the prior structure as are immediately associated with and pertinent to them, will be described in detail, the reader being referred to said patent for other details with which this invention is not concerned.

The two principal actuating means of the machine are an intermittently rotated turret 20 and an intermittently reciprocated carriage 40 (Fig. 1). The turret 20 is keyed to the forward end of shaft 21, which is supported in the bearing 22 in a casting 23 which forms the front end support of the machine and is suitably secured to the base 24. The shaft 21 extends longitudinally through the center of the machine and at its rear end it has keyed thereto a Geneva wheel 25 by means of which the shaft is intermittently rotated. A sleeve 26 encompasses part of the shaft 21 and bearings are imposed therebetween to permit relative movement. The sleeve 26 has a roller bearing 27 in the rear end support 28 of the machine frame. The spur gear 29 rotates sleeve 26 constantly. Secured to the forward end of the sleeve is a driving pin 30 which extends radially therefrom, so that the driving pin 30 rotates constantly in a plane normal to the axis of the sleeve.

The driving pin 30 engages a cylindrical camway 31 forming an integral part of the carriage 40. The function of the camway is to transform the constant rotation of the driving pin 30 into the intermittent reciprocation of the carriage 40. In order to prevent the carriage from rotating and to constrain it to reciprocatory movement, a pin 32 is rigidly secured to the carriage framework so as to extend vertically downward into engagement with a straight-line guide 33 attached to the base of the machine. A portion 35 of the path provided for the driving pin 30 in the camway is disposed in a plane normal to the axis of the cylindrical camway. While the driving pin 30 is travelling through this portion 35 the carriage 40 is maintained at rest. It is during this rest interval that the Geneva wheel 25 turns the shaft 21, so that the movements of the turret and carriage alternate.

The turret 20 has secured thereto six hollow stemming tubes which are equally spaced circumferentially of the turret. Two of these stemming tubes are shown at 36 and 37 in Fig. 1. When the turret comes to rest, the six stemming tubes are positioned opposite six stations on the carriage. The general locations of these stations are indicated in Fig. 2. The first station is indicated at 50. This is the station at which the pear is impaled on the stemming tube. A feeding mechanism carries the pears one after another to this station. The operator introduces the pear into the feeding mechanism at 38, from which the pear is carried by rotation of the feeding mechanism in the direction of the arrow 39 to the station 50, where the pear is impaled on the stemming tube so that the butt end projects outwardly therefrom.

When the turret rotates, the stemming tube carries the pear impaled thereon past a stationary butt-trimming knife, the position of which is indicated in broken lines at 51. This knife, the structure of which will be presently disclosed, trims the butt end of the pear (see Fig. 18) as the pear is being moved by the turret from the station 50 to the station 52 (see Figure 2, where the first pear peeling operation takes place. The next one-sixth turn of the turret brings the pear to the station 53, where a second peeling operation is performed, and two more peeling operations take place at stations 54 and 55. When the pear leaves the station 55 the exterior operations have been completed.

The pear is now presented to the station 56 where the interior operations are to be performed. These operations comprise removal of the core, etc. It will be understood that the numerals 50 to 56 in Fig. 2 do not refer to the actual mechanisms for performing the various operations, but are simply utilized to indicate the location of the six stations in a circle, these six stations being opposite the six stemming tubes on the turret. After the interior operations have been completed, the finished pear is discharged from the machine by an ejector mechanism, a portion of which appears at 57.

It will be noted in Fig. 2 that the butt trimmer is located at 51 intermediate stations 50 and 52 and that it is located above the first pear peeling unit. The location of the butt trimmer is also indicated in the side elevation of the machine in Fig. 1 at 51 and the peeling unit which appears in elevation immediately below it is the peeling unit which is located at station 52 in Fig. 2. This is the first peeling unit, and since the other three units which are located at stations 53, 54 and 55 are substantially identical in construction, only the first peeling unit is shown, the others having been omitted from Fig. 1 in order to avoid complicating the figure.

The mechanism for causing the one-sixth turn of the turret comprises the Geneva wheel 25 (Fig. 1) which appears in elevation in Fig. 4. The wheel is provided with six radial slots 60 into which a driving pin 61 enters. The driving pin 61 is on a gear wheel 62 driven from a pinion 63 on a constantly rotating power shaft 64. This shaft is driven from an electric motor, not shown. During the time that the driving pin 61 is not in engagement with one of the slots 60, a segmental ring 65 moves into locking engagement with arcuate surfaces 66 formed on the Geneva wheel 25 intermediate the slots 60.

The diagram in Fig. 3, which indicates the time of operation of certain parts of the machine, is based on the rotation of drive gear 62. For each revolution of the gear 62 the machine performs its cycle of operations. The time when the driving pin 61 enters a slot 60 of the geneva 25 and starts to turn the geneva is indicated by radial line 70 in the timing diagram, and the arrow 71 indicates the angle of rotation of gear 62 during which the driving pin 61 is imparting the 60° turn to the Geneva wheel, the radial line 72 representing the time when the driving pin 61 leaves the slot 60 and the Geneva wheel 25 and turret 20 come to a stop. The time at which the butt trimming operation takes place is indicated at 73 in the diagram. This operation occurs at the mid point of the turret movement, as the stemming tube on the turret carries the pear from the station 50 (Fig. 2) to station 52.

The butt trimmer can be seen in elevation in Fig. 5. It comprises a blade 100 carried by an arm 101 adjustably mounted on a bracket 102 which is rigidly secured to the part 103 of the framework of the machine. The bracket 102 (Fig. 6) is attached to the frame member 103 by screws 104. The arm 101 (Fig. 7) has a slideway 105 formed therein by means of which it is fitted onto the longitudinal face 106 (Fig. 6) of the bracket 102 for sliding adjustment relative thereto. The slideway 105 is maintained in contact with the bracket 102 by means of the screw 107 which passes through a slot 108 in the arm 101 and is threaded into the bracket 102.

The means for adjusting the arm 101 comprises a screw 109 having a flange 110 formed integrally with the head thereof, which flange engages in a groove 111 formed in the arm 101. The blade 100 is arcuate in shape, the ends being flat and apertured to receive screws 112 and 113 which are threaded into the arm 101. The aperture in the blade which receives the screw 113 is a slot 114 shown in broken lines in Fig. 7 and in section in Fig. 6. This slot permits change in the radius of curvature of the blade 100 by means of the adjusting screw 115 which is threaded through an ear 116 formed on the end of arm 101 and which abuts the end of the blade 100.

The purpose of this construction is to provide flexibility of adjustment of the butt trimming knife. This is desirable because the shape and size of the butt end of pears varies. With this flexible mounting the knife 100 can be so adjusted as to remove the minimum amount of material from the butt end of the pear and still remove as much as is necessary, so that the amount of waste is reduced to a minimum. As shown in Fig. 6, the knife is adjusted for its maximum radius of curvature. If, in operating the machine, it was found that the pears being prepared had a small bell and relatively short radius of curvature in the butt end, and that the knife at its present adjustment did not remove as much material as was desired, the screw 113 would be loosened and the adjusting screw 115 would be threaded inward, with the result that the radius of curvature of the blade 100 would be reduced, and when the desired curvature of the blade was attained the screw 113 would be tightened to retain it in this formation. This adjustment does not cause any substantial malformation or eccentricity of the blade. In all the various adjustments of the screw 115 the different curvatures of the blade 100 obtained are all substantially arcs of circles, the centers of which lie in the stem axis of the pear, indicated by the dot and dash line 117, when the pear is presented to the knife by rotation of the turret.

In addition to varying the curvature of the blade 100, its position longitudinally of the machine can be altered. This is so that the depth of cut on the butt of the pear can be changed, or, in other words, the position of the knife 100 can be moved longitudinally with respect to the stem axis of the pear. The adjustment is effected by loosening the screw 107 and turning the screw 109 until the desired adjustment is obtained, and then clamping the arm 101 in this adjusted position by means of the screw 107. When the knife has been finally adjusted as to curvature and longitudinal position, the butt stop 120 (Fig. 6) in the pear peeling units is correspondingly adjusted.

The reason the adjustment of the butt stop 120 is dependent on the adjustment of the butt trimmer is that when the turret 20 (Fig. 1) rotates to carry the pear past the butt-trimming station 51 to the first pear peeling station and then comes to rest, the butt stop 120 (see Figs. 19 and 20) is brought into contact with the trimmed surface of the butt of the pear in order to prevent the peeling knives 121, 122 from drawing the pear off of the stemming tube 37 when the peeling knives are drawn over the pear during the rearward movement of the carriage 40.

The four peeling units are substantially identical in their construction so that only one unit need be described and the one chosen for description is located at the first peeling station on the carriage. As can be seen in Fig. 5 it comprises, in addition to the butt stop 120, a pair of arcuate knives 121, 122. These knives engage the pear on opposite sides and remove two strips of peeling therefrom as the carriage draws them rearward, which direction is away from the reader in Fig. 5. At the next station the peeling knives, part of which can be seen in Fig. 5, are set at an angle with respect to the knives in the first station so that the strips of peeling which they remove were adjacent the first strips on the pear. When the knives in the fourth peeling station remove their strips the pear is completely peeled.

As can be readily appreciated, peeling a pear is a difficult and delicate operation. First of all the knives must be set so as to properly engage the nose of the pear which is the portion they first engage when they start the peeling. Then they must follow the contour of the pear, spreading apart as they encounter the increasing diameter of the bell portion of the pear. Also, each knife must be constantly turned so as to maintain its cutting edge at the correct cutting angle with respect to the pear surface or it will scrape and gouge instead of removing a strip of skin of uniform thickness.

Certain adjustments of the knives are automatically obtained during the peeling operation by means of gauge rollers 123, 129 (Fig. 5) which are spool-shaped and made of rubber. The knife and its gauge roller have the same curvature and the cutting edge of the knife is located close to the surface of the roller, the spacing being uniform throughout the length of the cutting edge. These gauges roll along the pear surface immediately ahead of the knives and determine their setting at every instant during the peeling operation.

The knife 122 and its gauge 123 (Fig. 9) are mounted on a pair of small bell cranks 124, 125. The knife 122 is secured by means of the screw 126 to crank 124 and by screw 127 to crank 125. The gauge roller 123 is mounted on an axle 128 (Fig. 8), the ends of which are journalled in bell cranks 124, 125 (Fig. 9) at 130, 131, respectively. The cranks 124, 125 have stub shafts 132 133 extending outwardly therefrom and journalled in the ends of a yoke 134 having a pin 135 rigidly secured thereto. The knife assembly just described and shown in Fig. 9 is the upper assembly in Fig. 8. The lower assembly, including the knife 121 and its gauge 129, are similarly mounted in the yoke 136.

These yokes are similarly mounted in the forwardly projecting ends 137, 138 of a pair of bell cranks arranged in scissors fashion, as shown in Fig. 8. The pin 135 fits into a bearing 139 provided therefor in the end 137 of its bell crank, and is held therein by means of a releasable clamping hook 140 which enables the operator to remove the yoke and its knife assembly for replacement or repair. A shoulder 190 is formed on the bell crank arm 137 adjacent the bearing 139 and fits over the yoke 134 to prevent it from rotating on its pin 135. The bell cranks are pivoted at 141, 142 on a bracket 143 attached by screws 144 (Fig. 5) to a plate 145, which is an integral part of the reciprocating carriage 40 (Fig. 1). It will thus be seen that, as the carriage reciprocates, the peeling units are carried forwardly and rearwardly by reason of their being mounted on the plate 145. In order to bring the peeling knives 121, 122 into engagement with the pear during the rearward stroke of the carriage, the bell cranks are rocked on their pivots.

The bell crank which operates the upper knife in Fig. 8 has a downwardly-extending arm 146 to which a pull rod 147 is attached by means of an eye screw 148 threaded into the hexagonal head of the pull rod and secured in adjusted position by a lock nut 150. The long hexagonal head of the pull rod provides a shoulder 149 which is adapted to contact an apertured boss 151 on a plate 152. This plate, as will presently be described, is periodically shifted back and forth. In the position it occupies in Fig. 8, it is in its forward position where its boss 151 is pressing against the shoulder 149 and urging the bell crank counterclockwise on its pivot 142 in order to move the peeling knife 122 outwardly. In order to bring the knife inwardly into engagement with the pear, the plate 152 moves rearwardly, compressing a spring 153 interposed between the rear face of the plate 152 and a washer 154 held in adjusted position on the pull rod 147 by lock nuts 155. As can be seen in Fig. 8, a substantially identical device is attached to the bell crank, which carries the other peeling knife 121. When the plate 152 moves back and forth, it causes the peeling knives 121, 122 to operate in unison either to open or to close upon the pear.

The knife control plate 152 (Fig. 2) extends around the four pear peeling stations 52, 53, 54 and 55 and serves as a common operator for all four pairs of knives, the hexagonal heads which provide the shoulders 149 appearing in section in this view. The plate 152 is mounted for reciprocatory movement in a direction parallel to the movement of the carriage 40 on shafts 156, 157, which are rigidly supported in the framework of the carriage. The reciprocation of the knife control plate 152 is caused by a semi-cylindrical cam 158 rigidly secured to the plate 152 and engaged by the driving pin 30, which, it will be recalled, extends radially from the front end of sleeve 26, which is constantly rotated in the direction of the arrow 159.

As shown in Fig. 2, the driving pin 30 has just come into engagement with the cam 158, and as shown in Fig. 1, the configuration of the cam 158 is such that the driving pin 30 will cause the plate 152 to be moved rearwardly with respect to the carriage 40, which, at this time, is being moved forwardly by engagement of the driving pin 30 with the camway 31. The relationship of the cam 158 with the camway 31 is also shown in Fig. 14, where developments of the two cams are superimposed.

It will be noted that the slope 160 of the cam 158 is parallel to the slope 161 of the camway 31, so that when the driving pin encounters the cam 158 at the point 162, it shifts the cam 158 until, when the driving pin has arrived at the point 163, the slope 160 is coincident with the slope 161 of the camway. Continued movement of the driving pin from the point 163 to the point 164 does not result in shifting the cam 158 with respect to the camway 31 but does cause the same displacement of both, so that the plate 152 and the carriage 40 reciprocate together.

The position of the parts shown in Fig. 1 is with the driving pin 30 moving the carriage 40 (and the peeling knives mounted thereon) forwardly and with the driving pin 30 beginning to move the cam 158 rearwardly with respect to the carriage 40 to cause the rearward displacement of the knife control plate 152 to resiliently close the peeling knives through the medium of the springs 153 on the bell crank pull rods.

The time at which this occurs is shown in the timing diagram (Fig. 3) by the radial line 74 which represent the instant that the driving pin encounters the point 162 (Fig. 14) of the cam 158. The arrow 75 (Fig. 3) representing the period required to close the knives terminates at radial line 76 which represents the instant the driving pin arrives at the point 163 (Fig. 14) on the knife operating cam 158. A comparison of these two illustrations emphasizes the fact that the knives are closed slowly (as indicated by the length of the arrow 75 in Fig. 3) and smoothly (as indicated by the long sweeping curve from 162 to 163 in Fig. 14). In other words, although the distance which the knife operating cam 158 is displaced relative to the main cam way 31 is relatively short, it is displaced slowly and smoothly so as to gently apply the spring pressure to the peeling knives.

The closure of the peeling knives occurs at the end of the forward stroke of the carriage. The carriage begins to move forward at the time represented by the radial line 77 (Fig. 3). This, it will be noted, occurs as the turret is coming to rest at 72. The arrow 78 represents the forward movement of the carriage which terminates at 79, arrow 80 representing the rearward movement which terminates at 81 just as the turret has again started to rotate at 70. The carriage remains at rest from 81 to 77 because during this time the driving pin is traveling through the rest portion 35 (Fig. 14) of the cam way.

The driving pin which is traveling in the direction of the arrow 165 emerges from the rest portion 35 of the camway at 166 and it is at this point that the forward movement of the carriage commences. The forward movement terminates when the driving pin arrives at 167. The carriage then begins its return movement which terminates when the pin arrives at 169 where it reenters the rest portion 35. The angular distance from 166 to 167 is less than that from 167 to 169, so that the carriage makes its forward stroke in less time than its return stroke. This fact is also illustrated in Fig. 3, where the length of arrow 78 is less than arrow 80.

The reason for this difference in speed is that during the forward stroke the carriage is is simply carrying the knives forward preparatory to beginning the actual peeling, which takes place on the return stroke, and since the peeling is a very delicate operation, it is this construction that affords a greater amount of time in which to draw the knives over the pear. The speed with which the knives can be drawn over the pear is necessarily limited, because of the fact that due to the contour of the pear the position of the peeling knives must constantly be changing, and particularly in rounding the bell of the pear the knives must not only change their angular position but must move first outwardly and then inwardly, as they descend the butt end of the pear. If this operation is performed at too great a rate of speed, the knives tend to pull out of contact with the pear in rounding the bell and to move off at a tangent instead of maintaining contact therewith.

The speed of operation of the machine, and hence its capacity, is determined to a great extent, therefore, by the amount of time which can be alloted to the return stroke of the carriage. This result is achieved by the above described construction, in that the carriage is moved forward at a relatively rapid rate from 166 to 167, and then rearward at a slower rate when the peeling is taking place from 167 to 169 (Fig. 14).

However, while it is possible to speed up the forward stroke of the carriage by the steep slope 168, it must be slowed down at the end of the forward stroke, so that the knives can be brought gently into engagement with the pear and are allowed time to adjust themselves for beginning the cut, as will presently be described. Accordingly, the camway has a deceleration curve beginning at 170 which brings the carriage smoothly to its stopping position at 167, and it is during this deceleration of the carriage, that is, while the driving pin is moving from 170 to 167, that the cam 158 is shifting backward to apply the spring pressure to the peeling knives.

The pressure remains uniform as the driving pin travels from 163 to 164 on the cam 158, but as the knives descend the butt end of the pear, a slight additional spring pressure is put on the knives in order to insure their remaining in contact with the pear during this steep descent, and for this reason the cam 158 has the curve 164 to 171. Then, the actual peeling having been completed at point 171 just prior to the end stroke of the carriage, which occurs at 169, the cam 158 falls off rapidly to 172.

As the driving pin travels from 171 to 172, the cam 158 is returned forwardly by springs encompassing the shafts 156 and 157 (Fig. 2), the spring on shaft 156 being visible at 173 in Fig. 1. These springs urge the plate 152 forwardly so that in Fig. 8 the boss 151 presses against the shoulder 149, urging the pull rod 147 forwardly to rotate the bell crank counterclockwise on its pivot 142, thus swinging the peeling knife outwardly.

The opening of the knives at the conclusion of the peeling operation is indicated by the arrow 82 in Fig. 3 which occupies only a short period of time from 83 to 84 due to the abruptness of the cam portion 171 to 172 (Fig. 14). From 76 to 83 (Fig. 3) during the return movement 80 of the carriage the peeling operation is taking place.

The peeling knife removes a strip of skin from the pear in the following manner: Once the knife has started to cut into the pear its adjustment is automatically controlled by its gauge roller (see Figs. 20, 21 and 22). For example, in Fig. 9, the knife assembly comprising the blade 122, the cranks 124, 125, and the gauge roller 123, constitute an integral unit free to rotate on the axis of the supporting stub shafts 132, 133. This axis is resiliently urged toward the pear by the spring 153 (Fig. 8) and the linkage governed thereby. The angular position of the blade 122 (Fig. 11) with respect to this axis (indicated by the broken lines 132) is controlled by contact of the gauge roller 123 with the surface of the pear immediately ahead of the cutting edge of the knife. When the gauge roller 123 rolls up the bell of the pear, it results not only in moving the axis 132 outwardly but also in rotating the knife assembly clockwise on the axis 132 to adjust the cutting angle of the knife 122, and then, as the gauge roller 123 rounds the bell of the pear and starts down the butt, it causes the axis 132 to move inwardly and also causes counterclockwise rotation of the knife assembly on the axis 132 to maintain the blade 122 at the proper cutting angle.

While the gauge roller controls the knife during the peeling operation by contact with the pear, it is not utilized to position the knife prior to the peeling operation. In fact, it is desirable to prevent the roller from engaging the pear before the knife does, as will now be described.

Referring to Fig. 2, it will be recalled that the pear was placed in the machine at 38 and carried around in the direction of the arrow 39 by the feed mechanism. When the pear passes the point 191 the stem end is trimmed off square by a rotary knife (not shown). Accordingly, if, at the beginning of the peeling operation the gauge roller 123 (Figs. 8 and 20) were permitted to strike against this squared-off end of the pear it would tend to mash down the corner. To prevent it doing so, the gauge roller is held outwardly away from the pear until the knife has cut into the end of the pear. As soon as the knife blade 122 (Fig. 13) engages the pear the drag of the knife swings the assembly counterclockwise on the axis 132, thus bringing the gauge roller 123 immediately into contact with the outer surface of the pear (see Fig. 20). From that point on, the gauge roller controls the knife.

This preliminary adjustment of the knife is partly achieved by unbalancing the weight on the pivotal axis of the knife assembly so that the assembly will automatically assume a position in which the gauge roller is swung out away from the pear and the knife is swung inwardly into line with the pear. For example, in Fig. 8 the unbalanced weight of the gauge roller 129 causes the assehmbly to rotate counterclockwise on its axis 174. This results in positioning the knife 121 nearer the pear than the gauge roller 129. In order to obtain the same result where the knife is above the pear, as is the knife 122, a counterweight 183 is attached to the knife assembly. This counterweight causes the knife assembly to rotate in the other direction, that is, clockwise on its supporting axis, so that the knife 122 is positioned nearer the pear than the gauge roller 123 prior to the beginning of the cut. It is to be understood that all of the knife assemblies in the four peeling units are substantially identical in construction except where it is necessary to attach counterweights 183 in order to attain the proper position of the knife blade at the beginning of the peeling operation.

It is not only necessary to unbalance the knife assembly so that the blade will swing in, but also to limit the swing so that the blade will be set at the proper angle to engage the pear. For this purpose a limit stop is adjustably mounted on one arm of each yoke alongside one of the bell cranks of the knife assembly. It comprises a plate 175 fastened by screws 176 to the yoke arm which is slotted at 177 to permit adjustment of the plate. This plate has a lug 178 with which shoulders 179 (Fig. 10) and 180 (Fig. 12) formed on bell crank 124 come into contact to determine the limits of angular movement of the knife assembly on its pivotal axis 132. When shoulder 179 is in contact with lug 178, as shown in Fig. 10, the knife 122 and its gauge roller 123 occupy the positions relative to axis 132 shown in Fig. 11. This is the limit of counterclockwise movement. The assembly is free to swing clockwise until shoulder 180 (Fig. 12) encounters lug 178 which brings knife 122 to the position shown in Fig. 13. This is the position it assumes to first engage the pear, the gauge roller 123 being swung up out of the way. This is the position the knife occupies in Fig. 8.

The gauge roller having been positioned out of the way and the knife having been positioned at the proper angle it is now only necessary to set the knife in a position where it will first engage the end of the pear near the skin. It will be recalled that the knife is moved inwardly by plate 152 (Fig. 8) shifting rearwardly to compress spring 153, pull rod 147 turning the bell crank on its pivot 142. By adjusting screw 181 threaded into the depending arm 146 of the crank the clockwise movement of the crank can be stopped wherever desired by the screw 181 coming into contact with the bracket 143. By this means the approach of the knife 122 in toward the stem axis of the pear can be determined so that at the beginning of the rearward stroke of the knife it is set at a distance from the axis of the pear where it will first engage the end of the pear out near the skin.

Figure 19:
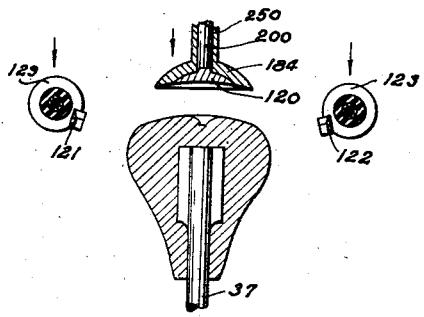
Figure 20:
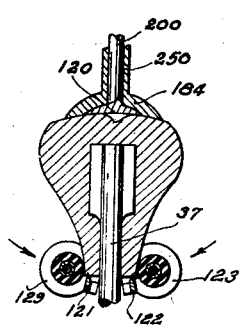
Figure 24:
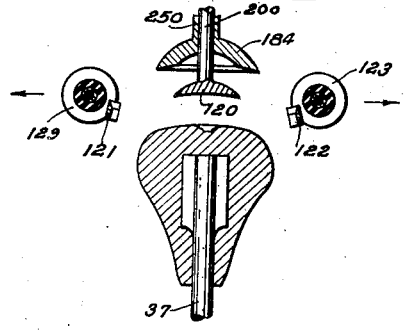

As previously mentioned, the butt stop 120 (Fig. 8) is brought into contact with the butt of the pear prior to the beginning of the peeling operation in order to prevent the peeling knives from pulling the pear off the stemming tube upon which it is impaled (see Figs. 19 and 20). The tendency of the knives to do this is greatest during the first part of the cut, when the knives are ascending the bell of the pear, and in order to obtain a greater area of contact for the butt stop during this part of the operation, a cup 184 (Fig. 1) is held in contact with the pear (see Figs. 20 and 21). However, as soon as the peeling knives round the bell and start down the butt end of the pear, the cup 184 must be withdrawn (see Fig. 22). This may safely be done at this time because when the knives are descending the butt of the pear, they have much less tendency to draw the pear off the stemming tube and the central butt stop 120 is sufficient to hold the pear on the stemming tube during the latter part of the peeling operation. The mechanism for controlling the operation of the butt stop will now be described.

The central butt stop 120 is secured to the forward end of a push rod 200 (Fig. 1), the rear end of which is threaded into a bracket 201 at 202 (Fig. 17). The adjustment of the rod 200 in the bracket 201 is maintained by a lock nut 203. An extension rod 204 is threaded into the bracket 201 at 205 so as to be in axial alignment with the push rod 200 and is held in adjusted position by lock nuts 206. Extension rod 204 extends rearwardly through an aperture 207 in a segment 210 which is rigidly mounted on the rear end support 28 (Fig. 1) by means of posts, one of which appears at 208 and to which the segment 210 is fastened by a screw 209.

The bracket 201 has an arm 213 which at 214 receives the threaded end of a guide rod 215 which passes through an aperture 216 in the segment 210. By this construction, the push rod 200 (Fig. 17) is restrained from rotating.

The push rod 200 reciprocates. A spring 212 urges it forwardly and adjustable lock nuts 211 limit its forward movement by engaging the segment 210 as shown in Fig. 17 and also in Fig. 16. It is moved rearwardly by the butt stop control arm 220 which reciprocates in a direction parallel to the push rod 200. The arm 220 has an apertured boss 221 (Fig. 17) the rear end of which moves into contact with a pick-up nut 222 secured in adjusted position on the push rod 200 by a lock nut 223. When, in the course of its rearward reciprocatory stroke, the arm 220 engages the pick-up 222, it shifts the push rod 200 rearwardly, the adjusting nuts 211 moving away from the segment 210 as shown in Fig. 15.

The butt stop control arm 220 serves all four peeling stations (Fig. 2). It is secured to and supported by a shaft 225 which is mounted for reciprocatory movement in bearings 226, 227 (Fig. 1) suitably attached to the framework of the machine. The shaft does not actuate the arm 220 but merely supports and guides it. The arm is reciprocated by means of the link 230 connected at its forward end by a pivot pin 231 to the arm 220 and connected at its rear end by a pivot pin 232 to a jaw cam 234 pivotally mounted on a pin 235 secured in a bracket 236 fastened to the base of the machine. The jaw of the cam 234 (Fig. 2) engages the pin 32 which, it will be recalled, extends downwardly from the carriage 40 into the straight-line guide 33 to prevent the driving pin 30 from causing rotation of the carriage. Therefore, the pin 32 reciprocates with the carriage 40.

The manner in which the pin 32 actuates the mechanism for operating the butt stop control 220 is illustrated by Figs. 15 and 16. In Fig. 15 the pin 32 is at the rear end of the straight-line guide 33, the carriage being at the rear end of its stroke. The pin 32 is also at the bottom of the jaw slot so that the link 230 has withdrawn the arm 220 to its rear position where it holds the push rod 200 rearward, the butt stop being withdrawn from contact with the butt of the pear to permit rotation of the turret. This is the position of the parts when the turret begins to rotate and is represented by the line 85 in Fig. 3, which is the same time as the line 81 marking the end of the carriage movement.

The butt stop remains withdrawn while the rotation of the turret (represented by arrow 71) is taking place. When the carriage again starts forward at 77 the butt stop also begins to advance at 88.

The slot in the jaw cam 234 (Fig. 16) comprises a relatively long portion 240 and a short portion 241 disposed at an angle thereto. All of the camming action takes place when the pin 32 is traveling in the short portion 241, the long portion 240 serving merely to maintain the cam in engagement with the pin and to retain the arm 220 advanced during the major part of the carriage reciprocation. When the pin 32 in leaving the bottom of the slot arrives at the position 242 indicated in broken lines the actuation of the arm 220 has been completed. The pin 32 then reciprocates out and back in the long portion 240 of the slot and when it returns to 242 it reenters the short portion 241 and withdraws the arm 220.

However, the entire movement of the arm 220 is not devoted to operating the push rod 200 for it also operates a tube 250 which has a telescopic movement on the push rod 200. It is to the forward end of the tube 250 that the cup 184 (Fig. 8) is secured. The cup 184, it will be recalled, assists the central butt stop 120 in holding the pear on the stemming tube during the first part of the peeling operation, or until the peeling knives have rounded the bell of the pear. Then it must be withdrawn.

This the butt stop control arm does by reason of the fact that the rear end of the tube 250 is secured to the arm as shown in Fig. 17. A split clamping sleeve 251 fits into the aperture of the boss 221 of arm 220 and grips the end of the tube 250, a set screw 252 being threaded through the boss to press against the sleeve 251. The other cup tubes 250 are similarly connected to the arm 220.

As shown in Fig. 15 with the carriage at its rear position, both the butt stop and its cup are withdrawn from pear-engaging position because the jaw cam 234 is holding the arm 220 rearward, which holds the tube 250 rearward, and by contact with pick-up 222 holds the push rod 200 rearward. When the carriage begins to move forward at 77 (Fig. 3) the butt stop and its cup simultaneously advance as indicated at 88 and 92, respectively. They advance together until the stop nut 211 (Fig. 16) engages the segment 210 which occurs at 90 (Fig. 3). The central butt stop is now in engagement with the butt of the pear, the nuts 211 being adjusted in accordance with the adjustment of the butt trimming knife so as to bring the stop 120 (Fig. 6) into the same plane as the knife 100, or so that the stop 120 will just touch the trimmed butt of the pear. The advance of the butt stop represented by the arrow 89 in Fig. 3 takes place during the first part of the movement of the pin 32 (Fig. 16) in the short portion 241 of the slot of the jaw cam 234 and it is completed before the pin 32 leaves the portion 241.

As the pin 32 continues outwardly in the portion 241 it continues to move the arm 220 so that the tube 250 and its cup continue to advance and a gap opens up between the pickup 222 on the arrested push rod 200 and the boss 221, as shown in Fig. 16. The cup 184 finally comes to rest against the butt of the pear where it registers with the central butt stop 120 as shown in Fig. 1. It arrives at this position when the pin 32 (Fig. 16) reaches the position 242 at the junction of the short and long slot portions 241, 240, the tube 250 (Fig. 17) being adjusted by means of the sleeve 251 and set screw 252 to bring this about. The time of its arrival is indicated by the line 93 (Fig. 3) marking the end of the cup movement arrow 96. During the time from 90 to 93 the gap between 221 and 222 (Fig. 16) was opening.

Figure 21:
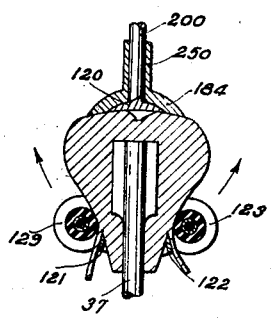

The peeling knives then close on the pear as indicated by arrow 75 (Fig. 3) and the carriage starts rearward as indicated by arrow 80 and the peeling operation begins (see Figs. 20 and 21). During this time the pin 32 (Fig. 16) is moving idly out and back in the slot portion 240. When it returns to the position 242 the carriage is approaching the end of its stroke and the peeling knives are rounding the bell of the pear. It is now time to withdraw the cup 184 (Fig. 1) and this the arm 220 does when the pin 32 (Fig. 16) reenters the short slot portion 241 (see also Fig. 22). This occurs at 95 (Fig. 3).

Figure 23:
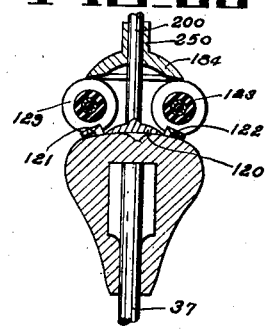

The central butt stop remains in contact with the butt of the pear while the peeling knives are descending the butt and when they leave the butt they pass by the stop 120 as shown in Fig. 9 and also in Figs. 5 and 23. Then the boss 221 (Fig. 15) of the rearwardly moving arm 220 contacts the pickup 222 and starts to withdraw the central butt stop. This takes place at 87 in Fig. 3 (see also Fig. 24). The withdrawal 86 of the stop is complete at 85, coinciding with 91 the end of the cup withdrawal 96, and with 81 the end of the carriage return 80.

While I have described a particular embodiment of the present invention, it will be obvious that various changes and modifications may be made in the details thereof without departing from the spirit of the present invention and the scope of the appended claims.

Having now described my invention and in what manner the same may be used, what I claim as new and desire to protect by Letters Patent is:

1. In a pear preparation machine having a reciprocatory peeling mechanism and means to hold the pear with its stem axis parallel to the path of reciprocation: said peeling mechanism including a pivotally-mounted knife assembly which is resiliently urged toward the pear during the peeling stroke of said mechanism, said knife assembly including a peeling blade and a gauge therefor adapted to contact the pear surface, the weight of said knife assembly being unbalanced on its pivot so that said blade is thereby automatically positioned to engage the pear before said gauge at the beginning of the peeling stroke of said mechanism.

2. In a pear preparation machine having a reciprocatory peeling mechanism, and means to hold the pear with its stem axis parallel to the path of reciprocation: said peeling mechanism including a knife assembly pivotally mounted in a carrier therefor, said knife assembly including a peeling blade and a gauge therefor, said knife assembly being unbalanced on its pivot so that the weight of the assembly will cause the assembly to rotate on said pivot to move said peeling blade toward said stem axis, and a stop on said carrier adapted to limit the rotation of said knife assembly on its pivot to position said blade to engage the pear before the gauge at the beginning of the peeling stroke of said mechanism.

3. In a pear preparation machine having a reciprocatory peeling mechanism, and means to hold the pear with its stem axis parallel to the path of reciprocation: said peeling mechanism including two yokes adapted to be urged toward the pear from above and below, a crank pivoted in each end of each yoke so that the pair of cranks in each yoke have a common pivotal axis, an arcuate peeling blade secured to each pair of cranks on one side of the pivotal axis thereof, a gauge adapted to contact the pear surface and supported by each pair of cranks on the other side of the pivotal axis thereof, said pivotal axes being located so that said blades tend to occupy a position at the top of their circles of movement about said axes, and a counterweight attached to a crank in the yoke above the pear on the blade side of the crank's pivotal axis so that the blade above the pear tends to occupy a position at the bottom of its circle of movement about its pivotal axis.

4. In a pear preparation machine having a reciprocatory peeling mechanism, and means to hold the pear with its stem axis parallel to the path of reciprocation: said peeling mechanism including two yokes adapted to be urged toward the pear from above and below, a crank pivoted in each end of each yoke so that the pair of cranks in each yoke have a common pivotal axis, an arcuate peeling blade secured to each pair of cranks on one side of the pivotal axis thereof, a gauge adapted to contact the pear surface and supported by each pair of cranks on the other side of the pivotal axis thereof, said pivotal axes being located so that said blades tend to occupy a position at the top of their circles of movement about said axes, a counterweight attached to a crank in the yoke above the pear on the blade side of the crank's pivotal axis so that the blade above the pear tends to occupy a position at the bottom of its circle of movement about its pivotal axis, and a stop plate adjustably secured to each yoke so as to limit rotation of each pair of cranks on its pivot.

5. In a pear preparation machine having means to hold the pear during the peeling operation, a peeling unit including a pivotally-mounted knife assembly, a control for said knife assembly operable either to resiliently press the knife assembly toward the pear or to withhold it from engagement with the pear, said peeling unit being mounted on a reciprocatory carriage which, on its forward stroke, carries the knife assembly beyond the pear and, on its return stroke, draws the knife assembly back over the pear to peel off the skin: said knife assembly including a peeling blade and a gauge therefor adapted to contact the pear surface, said knife assembly being unbalanced on its pivot so that the gauge is swung away from the pear when the knife assembly is out of engagement with the pear, and a limit stop cooperating with said knife assembly to set the blade for beginning the cut, a reciprocator for said carriage including a cam to cause the carriage to gradually decelerate and come to a smooth stop at the end of the forward stroke so as not to jar the knife assembly and disturb the preliminary setting of the blade, and an actuator for said knife control including a cam to gradually increase the pressure on the knife assembly as the carriage is slowing down at the end of the forward stroke.

6. In a pear preparation machine having means to hold the pear during the peeling operation, a peeling unit including a knife, a control for said knife operable either to resiliently press the knife toward the pear or to withhold the knife from engagement with the pear, said peeling unit being mounted on a reciprocatory carriage which, on its forward stroke, carries the knife beyond the pear and, on its return stroke, draws the knife back over the pear to peel off the skin: a reciprocator for said carriage, including a cam having a portion the configuration of which is such as to cause the carriage to begin decelerating in the forward stroke at a substantial distance from the end thereof, and to continue decelerating gradually until it comes to a smooth stop at the end of the stroke, and then to gradually accelerate at the beginning of the return stroke, and an actuator for said knife control, including a second cam having a portion the configuration of which is such as to cause the control to begin to press the knife toward the pear at substantially the same time that said first cam begins to decelerate the carriage, and to gradually increase the pressure upon the knife while said first cam is bringing the carriage to a stop.

7. In a pear preparation machine having means to hold the pear during the peeling operation, and a peeling unit including a knife, said peeling unit being mounted on a carriage which, on its forward stroke, carries the knife beyond the pear and, on its return stroke, draws the knife back over the pear to peel off the skin: a reciprocator for said carriage, including a cam to cause the carriage to perform its return stroke at substantially constant speed but to perform its forward stroke at a greater speed except as it approaches the end of the forward stroke when the speed is gradually reduced to zero.

8. In a pear preparation machine having means to hold the pear during the peeling operation, and a peeling unit including a knife, said peeling unit being mounted on a reciprocatory carriage which, on its forward stroke, carries the knife beyond the pear and, on its return stroke, draws the knife back over the pear to peel off the skin: a reciprocator for said carriage, including a cam to cause the carriage to perform its forward stroke in less time than its return stroke.

9. In a pear preparation machine having a stemming tube on which the pear is impaled and held in position for the peeling operation, and a reciprocatory peeling mechanism including a knife which is drawn over the pear to peel off the skin and which tends to pull the pear off the stemming tube: a stop adapted to be moved into contact with the butt of the pear in order to hold it on the stemming tube, a reciprocator for said peeling mechanism, and a linkage positively interconnecting said reciprocator and said stop to cause the reciprocator to positively actuate the stop.

10. In a pear preparation machine having a stemming tube on which the pear is impaled and held in position for the peeling operation, and a peeling unit including a knife which is drawn over the pear to peel off the skin and which tends to pull the pear off the stemming tube, said peeling unit being mounted on a reciprocatory carriage; a stop adapted to be moved into contact with the butt of the pear in order to hold it on the stemming tube, and a linkage to positively actuate said stop, said linkage having a positive pin-and-slot connection with said carriage.

11. In a pear preparation machine having a stemming tube on which the pear is impaled and held in position for the peeling operation, and a peeling unit including a knife which is drawn over the pear to peel off the skin and which tends to pull the pear off the stemming tube, said peeling unit being mounted on a reciprocatory carriage: a stop adapted to be moved into contact with the butt of the pear in order to hold it on the stemming tube during the peeling operation, a linkage to move said stop, said linkage including a jaw cam, and a pin on said reciprocatory carriage engaging in said jaw cam, said cam being constructed to actuate said linkage to move the stop against the pear at the beginning of the forward stroke of the carriage.

12. In a pear preparation machine having a reciprocatory carriage, a plurality of peeling units mounted on said carriage, and a turret equipped with stemming tubes on which the pears are impaled and held in position for peeling by said units, each unit including a knife which is drawn over the pear during the return stroke of the carriage to peel off the skin, the tendency of said knife to pull the pear off the stemming tube being greatest during the first part of the peeling operation: a plurality of stops each adapted to be moved into contact with the butt of a pear by a spring-pressed push rod in order to hold the pear on the stemming tube during the peeling operation, a cup adapted to fit around each stop and to be moved into contact with the butt of the pear to assist the stop in holding the pear on the stemming tube during the first part of the peeling operation, each cup being secured to one end of a tube which is telescopically mounted on the associated push rod, the other ends of said cup tubes being mounted in a common arm, a pick-up on each push rod which is spaced from said arm when the cup and butt stop are in contact with the pear, and means including a cam actuated by said carriage for operating said arm to withdraw said cups after the first part of the peeling operation has been completed and to engage said pick-ups to withdraw said butt stops at the end of the peeling operation.

13. In a pear preparation machine having a reciprocatory carriage, a plurality of peeling units mounted on said carriage, and a turret equipped with stemming tubes on which the pears are impaled and held in position for peeling by said units, each unit including a knife which is drawn over the pear during the return stroke of the carriage to peel off the skin, said knife tending to pull the pear off the stemming tube: a plurality of stops each adapted to be moved into contact with the butt of a pear in order to hold it on the stemming tube during the peeling operation, each stop having a spring-pressed push rod with a pick-up thereon, a common control arm adapted to engage said pick-ups and withdraw the push rods against the pressure of their springs, and a cam connected to said arm and operated by said carriage.

14. In a pear preparation machine having a reciprocatory carriage, a peeling mechanism mounted thereon, a stemming tube on which the pear is impaled and which positions the pear for peeling, said peeling mechanism including a knife which is drawn over the pear during the return stroke of the carriage to peel off the skin and which tends to pull the pear off the stemming tube: a device adapted to hold the pear on the stemming tube, said device being adjustably secured in an arm which moves it into and out of engagement with the butt of the pear, and positively actuated means controlled by said carriage to positively actuate said arm.

15. In a pear preparation machine having a rotary turret equipped with stemming tubes on which the pears are impaled: a flexible, arcuate knife to trim off the butt end of the pear, an arm to carry said knife, means adjustably secured to said arm for changing the curvature of the knife, and a support for said arm adjustable in a direction normal to said turret.

16. In a pear preparation machine having a rotary turret equipped with stemming tubes for carrying the pears impaled thereon, and a reciprocatory carriage equipped with peeling mechanism including peeling knives which tend to draw the pear off the stemming tube: a stationary knife adapted to trim off the butt of the pear when the turret rotates, said knife having a mounting which has two adjustments, one to determine the radius of curvature of the trimmed butt of the pear, the other to determine the position of the center of the radius of curvature on the stem axis of the pear, a butt stop adapted to be brought into contact with the butt of the pear during reciprocation of the carriage to prevent the peeling knives from pulling the pear off the stemming tube, and an adjustment for said butt stop to enable it to be positioned exactly in contact with the butt of the pear after said butt knife has trimmed off the butt.

17. In a pear preparation machine having a supporting framework, a shaft mounted for rotation therein, a turret on said shaft and adapted to be rotated thereby, said turret having stemming tubes for carrying the pears impaled thereon, a carriage on said shaft and adapted to be reciprocated toward and away from said turret, said carriage having peeling mechanism mounted thereon including peeling knives which tend to pull the pears off the stemming tubes when the carriage moves away from the turret: a butt knife mounted on said framework and adapted to be adjusted toward and away from said turret so as to determine the amount of material to be cut from the butt of the pear, and a butt stop adjustably mounted in said framework so that its operative position will correspond to the adjusted position of said butt knife, said butt stop in its operative position contacting the trimmed-off butt of the pear to prevent said peeling knives from pulling the pear off the stemming tube.

18. In a pear preparation machine, a rotary turret, means on said turret for holding the pear with the butt end exposed, an arcuate flexible knife adjacent said turret, means for operating said turret and holding means for moving the pear past said knife to trim the butt end of the pear, and means for adjusting the arcuate curvature of said knife.

19. In a pear preparation machine, an arcuate flexible butt trimming knife, a support for said knife, and adjustable means associated with said support and knife for adjustment longitudinally of said knife to flex said knife and thereby vary its arcuate curvature.

20. In a pear preparation machine having means for holding the pear with the butt end exposed, a stationary knife, and means for operating said holding means to move the pear past said knife to trim off the butt end: a support for said knife, means for securing one end of the knife to said support, means for adjustably securing the other end of said knife to said support, the intermediate part of said knife being arcuate and flexible, and adjusting means associated with said support and knife for varying the curvature of the intermediate part of said knife.

21. In a pear preparation machine having means for holding the pear with the butt end exposed, a stationary knife, and means for operating said holding means to move the pear past said knife to trim off the butt end: a support for said knife, means for securing one end of the knife to said support, means for adjustably securing the other end of said knife to said support, the intermediate part of said knife being arcuate and flexible, and a screw adjustably mounted on said support and engaging the other end of the knife for varying the curvature of the intermediate part of said knife.

ALBERT R. THOMPSON.